Nov. 4, 1930.  J. K. OLSEN  1,780,310
FUEL FEEDING APPARATUS FOR INTERNAL COMBUSTION ENGINES
Filed March 17, 1927
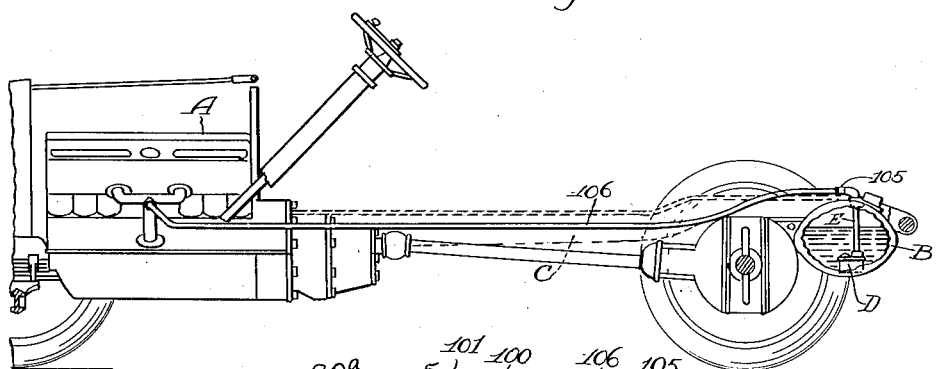
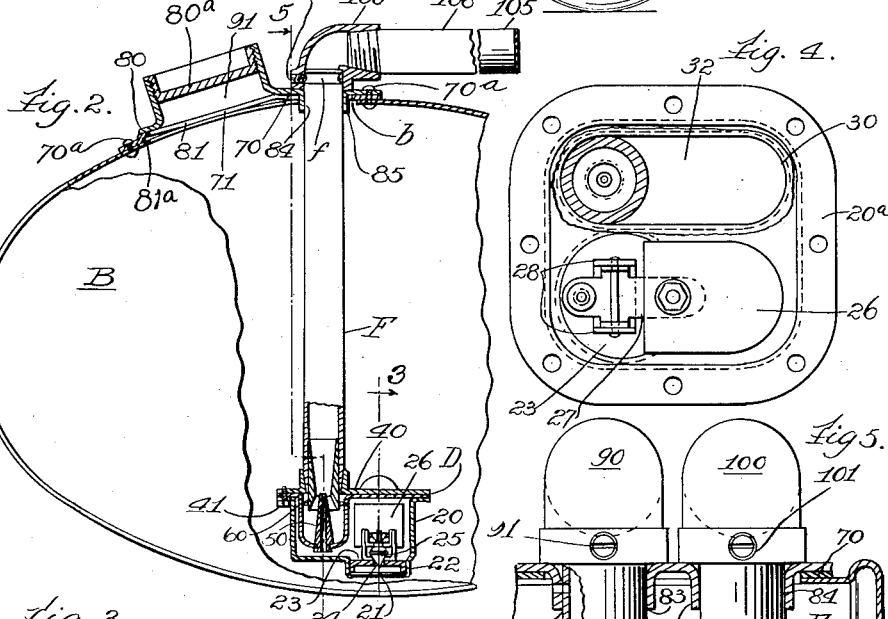
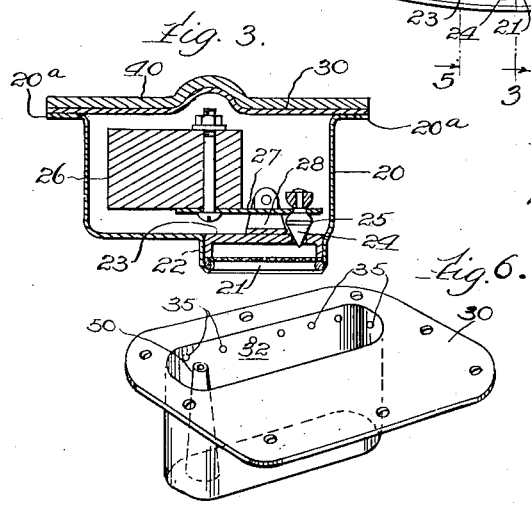
Inventor.
John K. Olsen.
by Burton Burton
his Attorneys.

Patented Nov. 4, 1930

1,780,310

UNITED STATES PATENT OFFICE

JOHN K. OLSEN, OF CHICAGO, ILLINOIS, ASSIGNOR TO STEWART-WARNER CORPORATION, OF CHICAGO, ILLINOIS, A CORPORATION OF VIRGINIA

FUEL-FEEDING APPARATUS FOR INTERNAL-COMBUSTION ENGINES

Application filed March 17, 1927. Serial No. 175,954.

The purpose of this invention is to provide an improved construction for supplying fuel feed to an internal combustion engine from a main supply tank which may be located at some distance, and at the lower level, as at the rear of the vehicle to which the engine pertains, the entire construction for producing fuel mixture being associated with such main tank carrying only a part of the mixture to the engine intake. It consists in the elements and features of construction shown and described, as indicated in the claims.

In the drawings—

Figure 1 is a diagrammatic view showing the relative position of the several parts of the structure on the vehicle, the main tank at the rear of the vehicle being broken away and disclosing the fuel feeding devices which are supported within the tank and submerged in the fuel receptacle when the tank is occupied with fuel;

Figure 2 is a vertical fore and aft section of the main tank and the fuel feeding devices therein;

Figure 3 is a section on the line 3—3 on Figure 2;

Figure 4 is a section on the line 4—4 on Figure 5;

Figure 5 is a section on the line 5—5 on Figure 2;

Figure 6 is a perspective view of an element of the fuel receptacle.

In the drawings the engine to be served is indicated conventionally at A. The main fuel supply tank hereinafter referred to as the fuel container, is indicated at B at the rear of the vehicle of which the chassis is indicated in dotted line at C. Within the container B there is positioned and supported near the bottom thereof a fuel receptacle indicated in totality by the reference letter D, to which an air supply pipe E leads, entering through the top of the container B, and from which the fuel mixture pipe F, emerging through the top of the container, leads to the engine. The fuel receptacle comprises a cup-shaped element 20 which is a stamping formed with a bottom opening 21 circumscribed by a downwardly projecting flange 22, which is provided with a closure member 23 which effects the closure by fitting tightly within the flange 22, and which has a fuel inlet port 24 controlled by a valve 25, the valve in turn being controlled by a float 26 carried on a lever member 27 fulcrumed upon brackets 28 extending upward from the closure member 23, which carries the float at one end and the valve 25 at the other end, as seen in Figure 4. The operation of the float controlled valve will be readily understood to be that when the receptacle chamber becomes occupied with liquid entering from the container past the valve 25 to a predetermined depth in the receptacle, the float is operated by its buoyancy to close the valve and thereby maintain uniform depth of liquid in the receptacle.

The float and valve construction described occupies only about one half of the width of the fore and aft dimension of the receptacle D; and the receptacle is provided with a metal stamping indicated as to its entirety by the reference numeral, 30, and in its entirety constituting a top closure for the receptacle, D, said closure member comprising a horizontal web or flange, 30ª, and a deeply depressed part, 32, the latter depending in the cup member, 20, at the side thereof which is not occupied by the float and valve construction described, as most clearly seen in Figure 2, said depending part, 32, constituting, and hereinafter referred to as, a hood for the intake mouth of said fuel mixing pipe F, and by its cavity constituting a well into which the air descends through the air pipe, E, and from which it is withdrawn by engine suction for mixing in the venturi with the fuel delivered through the fuel nozzle hereinafter mentioned.

The closure member 30 is secured to the top of the cup member 20 by means of a cover plate 40 horizontally dimensioned for seating over the flange 20ª of the cup member and clamping the margin of the closure member 30 between said flange and said cover plate which is secured to the cup member by screws 41 taking through said flange and through the margin of the closure member into the cover plate. Said cover plate has apertures 42 and 43 circumscribed by upwardly extending flanges 42ᵃ and 43ᵃ, constituting what may be termed "nipples" for affording means for connection with the receptacle of the air supply pipe E and fuel mixture pipe F, which are thus coupled at their lower ends by the hood 32, said hood being dimensioned lengthwise for spanning the apertures 42 and 43 at which the pipes E and F are connected. Small apertures 35 are made in said hood, 32 at a point above the governed level of the liquid in the receptacle D. As thus far described, it will be seen that no communication is afforded between the conduit consisting of the two pipes E and F, and the fuel containing space of the receptacle D. Such communication is afforded by a fuel nozzle 50 which is inserted through the bottom of the hood 32 and extends up in axial alignment with the fuel mixture pipe F in whose lower end there is mounted a venturi 60 whose lower end portion protrudes in the well, 32ᵃ, formed by the cavity of the hood, 32, within which, venturi near the constriction thereof, the fuel nozzle 50 terminates for discharge.

The entire construction thus far described comprising the receptacle and the air supply and fuel mixture pipes connected thereto, is dimensioned for entering through an aperture, b, in the upper side of the container B and is supported in the position described; that is, with the receptacle B at the lower part of the cavity of the container by means provided for closing said aperture b. This means consists of an escutcheon plate 70 dimensioned for lapping the margin of the aperture b and adapted to be secured thereto in any suitable manner, as by bolts or rivets indicated at 70ᵃ. This escutcheon plate has an aperture, 71, corresponding approximately in dimensions to the aperture, b. Upon the escutcheon plate, 70, there is mounted a fitting, 80, which is a sheet metal stamping having a filling aperture, 81, encompassed by an outwardly struck flange, 81ᵃ, said aperture registering with the left hand end portion of the aperture, 71, of the escutcheon plate, and said flange, 81ᵃ, being interiorly threaded for receiving a plug, 80ᵃ. The fitting, 80, has a second aperture, 82 (see Figure 5) encompassed by an inwardly projecting flange, 83, and a third aperture, 84, encompassed by a similar flange, 85 (see Figures 2 and 5). Both said similarly flanged apertures, 82 and 84, are positioned for registering with the right hand end portion of the aperture, 71. The aperture 83 and its flange are dimensioned for snugly accommodating the air supply pipe E, and the aperture 84 and its flange are similarly dimensioned for snugly accommodating the fuel mixture pipe F. The pipes E and F at their ends protruding above the container and above the fitting 80 are provided with peripheral grooves, e and f, and elbow fittings 90 and 100, dimensioned for fluid-tight engagement with the ends of said pipes respectively, have set screws 91 and 101 respectively adapted to engage annular grooves at the ends of the pipes E and F for securing the elbows to the pipes respectively with capacity for angular adjustment thereabout to cause the pipes 105 and 106, connected respectively to the other ends of said elbows, to trend in the direction most convenient for connecting the pipe 106 with the engine intake, and the pipe 105 with any preferred source of air supply, if it is not desired to supply atmospheric air for fuel mixture, as for example, if it is desired to furnish air pre-heated by the engine exhaust, or other means.

It will be understood from the foregoing description that the operation of this construction is that upon the starting of the engine, the engine suction communicated through the pipe 106 and fuel mixture pipe F draws in the air through the air supply pipe E producing an area of low depression at the constriction of the venturi 60, which will take the fuel through the nozzle 50 from the receptacle chamber, thereby producing fuel mixture suitable for running the engine. It will be understood that the level of the liquid fuel in the receptacle D, being maintained subtantially constant by the float control of the valve 25, the amount of fuel withdrawn through the nozzle will be independent of the depth of the liquid in the container B.

I claim:

1. In a construction for the purpose indicated comprising a container for fuel and connections therefrom for conducting fuel to the engine intake, apparatus in the container for effecting delivery of fuel therefrom through said connections, said apparatus comprising two conduits constituting said connections, a receptacle consisting of an upwardly open cup and a top plate applied liquid-tight onto the upper margin of the cup, said top plate having apertures for liquid-tight junction therewith of said two conduits; one of said conduits leading to the atmosphere and the other constituting the fuel delivery connection; a member interposed between the upper margin of the cup, and said top plate comprising a web and flange dimensioned for completely covering and closing the first mentioned cup at the top of the latter, and comprising a depression dimensioned horizontally for spanning and effecting the coupling together of the two conduits at the under side of said cover plate.

2. A liquid receptacle for the purpose indicated, in cup form having a marginal flange; a closure for the mouth of said receptacle comprising a web dimensioned for seating over the entire circumferential extent of the flange and having a depression extending down into the receptacle; a cover for the receptacle dimensioned for seating upon the margin of the closure member for clamping the margin of the closure member upon the flange of the receptacle, said cover member having apertures for connection with air supply and fuel mixture pipes positioned for registering with the mouth of the depression in the closure member, whereby said depression constitutes a coupling between the pipes; and a nozzle inserted through the bottom of the depression in substantially axial alignment with one of the pipes.

3. In a construction for the purpose indicated, a fuel container having an opening dimensioned for admitting a fuel feeding device and air and fuel mixture pipes; means for closing said opening and supporting fuel feeding device and pipes, comprising an escutcheon plate dimensioned for seating at the margin of said opening having an aperture corresponding to said opening, and a fitting mounted on the escutcheon plate having an exteriorly flanged filler opening adapted for receiving a plug, and interiorly flanged openings for admitting air supply and fuel mixture pipes respectively, the flanges of said openings being positioned for protruding through the escutcheon opening, said escutcheon plate and fitting being rigidly secured together, and air and fuel mixture pipes mounted in and protruding through said fitting and pipe fittings connected to the protruding ends, respectively stopping on the upper side of said fitting for supporting the pipes and the fuel feeding device in the container.

4. In combination with a liquid fuel container, a liquid fuel receptacle arranged for mounting in the liquid containing space of the container and having a fuel inlet port for deriving fuel content from the container, said recepatcle having connected at its upper side an inleading conduit and an outleading conduit; means for rendering said conduits substantially continuous with each other in their course into and out of the receptacle, said means consisting of a hood mounted in the receptacle for liquid-tight junction with the wall of the receptacle at which said conduits are connected, and a fuel nozzle mounted in the hood open in the receptacle at the end at which it is thus mounted in the hood and protruding within the hood into the open end of the outleading conduit.

5. In the construction defined in claim 4, the hood having a web extending off from its upper end dimensioned for closing the upper end of the fuel receptacle; the receptacle wall member at which said conduits are connected being applied on said web of the hood for securement to the receptacle and clamping said web of the hood thereto.

6. The construction defined in claim 4, the hood being dimensioned for occupying a limited lateral portion only of the receptacle and having a web extending off from its upper end dimensioned for closing the upper end of its receptacle over the entire area thereof, the receptacle having a bottom opening, a closure for said bottom opening having a valve port, a valve mounted on said closure for controlling said port, a float also mounted on the closure for controlling the valve, the structure comprising said bottom closure, valve and float being dimensioned for being accommodated in the space of the receptacle laterally of that occupied by the hood, and the bottom opening being dimensioned for admitting the float and valve mounted on the closure in the movement of the closure to position it for closing said bottom opening.

In testimony whereof, I have hereunto set my hand this 7th day of March, 1927.

JOHN K. OLSEN.